Sept. 18, 1928.  1,685,032
C. A. PARSONS
MIRROR, REFLECTOR, AND THE LIKE
Filed Dec. 27, 1923
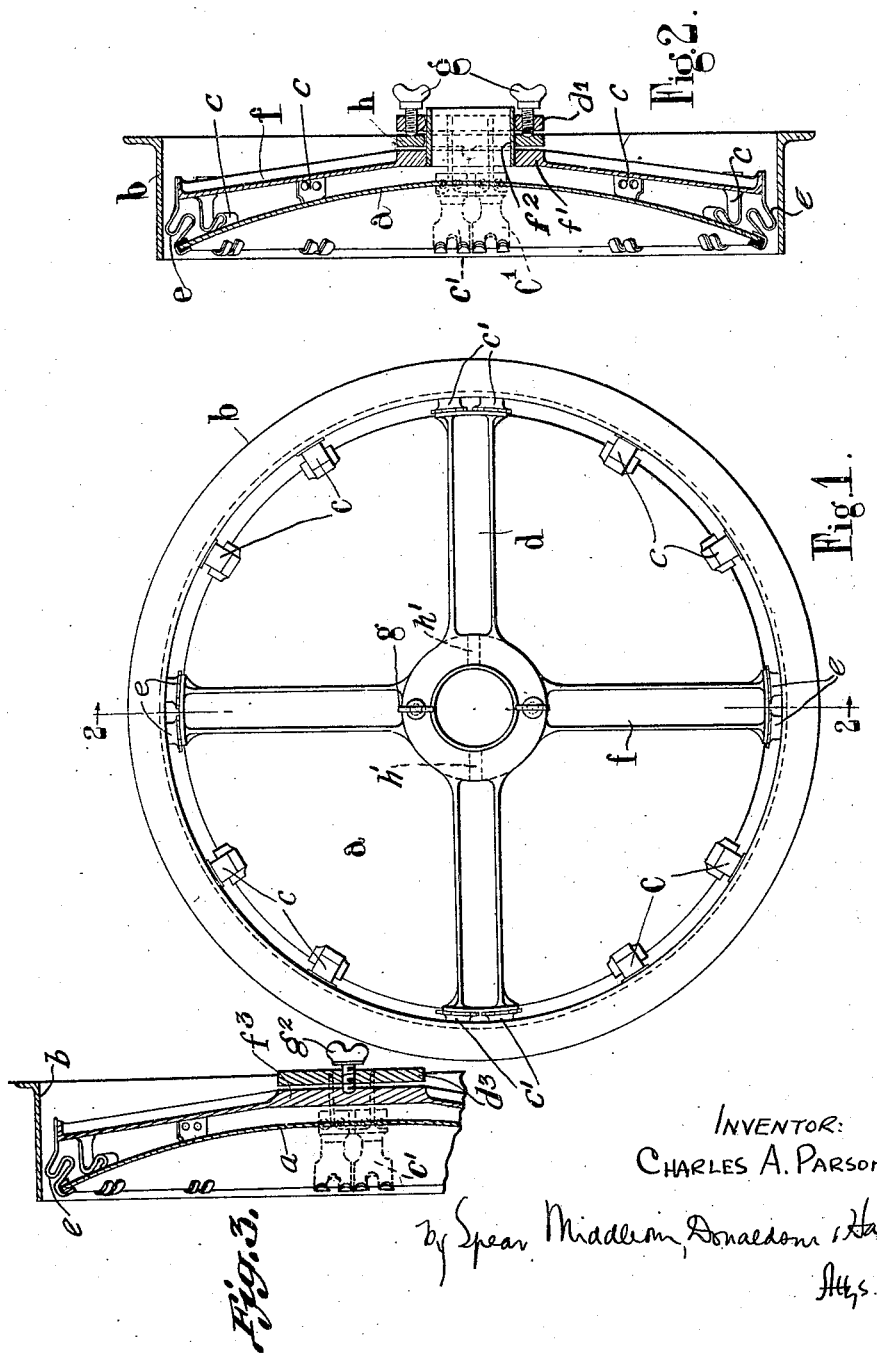
INVENTOR:
CHARLES A. PARSONS.
by Spear, Middleton, Donaldson & Hall
Attys.

Patented Sept. 18, 1928.

1,685,032

UNITED STATES PATENT OFFICE.

CHARLES ALGERNON PARSONS, OF NEWCASTLE-ON-TYNE, ENGLAND.

MIRROR, REFLECTOR, AND THE LIKE.

Application filed December 27, 1923, Serial No. 683,018, and in Great Britain January 27, 1923.

This invention relates to searchlight mirrors, reflectors and the like receiving the rays directly from a source of light and projecting them in the form of a beam, such mirrors, reflectors or the like being hereinafter referred to as searchlight projector mirrors.

The primary object of the present invention is to modify the shape of the beam of light reflected from such mirrors; for example, in many cases it is desirable to secure a fan-like beam of sufficient lateral divergence to increase greatly the field of illumination in a horizontal direction while preserving the concentration in the vertical direction.

I am aware that with a similar object parabola-ellipse mirrors have been constructed to give a wide-angle fan-like beam, a common angle of divergence being 15°, and I am also aware that parabolic mirrors split down a diameter and hinged have been used to give two beams, each in itself parallel but adjustable at different angles in relation to one another.

According to the present invention, means hereinafter described and particularly pointed out in the claims are provided whereby the shape of the beam is modified by elastic deformation of the mirror.

For example, taking the case of a barabolic silvered glass reflector giving a nearly parallel beam or cone of light of a small divergence of about 2° or so depending on the diameter of the crater of the positive carbon, it is possible by elastic deformation of the glass to modify the beam to a fan-like form of the nature referred to above.

Referring to the accompanying drawings:—

Figure 1 is a rear elevation of a mirror according to one form of the invention;

Figure 2 being a cross-section on the line 2—2 of Figure 1, as seen in the direction of the arrows;

Figure 3 is a similar cross-section showing a modification of the invention.

In carrying the invention into effect according to the illustrative form shown, the silvered glass mirror, $a$, of parabolic form, is supported centrally in a frame, $b$, of angle section by a series of flexible spring clips, $c$, in the usual manner in order to guard the mirror from shock.

The mirror on the horizontal centre line is secured to the opposite ends of one distorting member or beam, $d$, by means of a spring, $c'$, or series of springs, side by side, of a form similar to the spring clips, $c$.

The mirror at each end of the vertical diameter is held to the cross beam or distorting member, $f$, by flexible clips, $e$, of a form similar to $c$, hooked at the ends to engage the edge of the mirror. The beams, $d$ and $f$, are formed with apertured circular central members, $d'$ and $f'$, respectively, coaxially disposed in relation to the mirror, this circular member, $f'$, carrying a centralizing tube, $f^2$, threading through the axial aperture of the central member, $d'$, and also through the axial aperture of a compensating plate, $h$, interposed between the central circular members, $d'$ and $f'$. The compensating plate, $h$, is formed on one surface with two diametrally-disposed ridges, $h'$, $h'$, bearing on the circular member, $f$, while two diametrally-disposed ball-ended screws, $g$, $g$, pass through the circular central member, $d'$, and bear on the other face of the plate, $h$. The combined effect of these beams produces distortion in the mirror when the ball-ended screws, $g$, $g$, are tightened against the compensating plate, $h$, causing the mirror to be pushed with equal forces at the ends of its vertical diameter and pulled simultaneously with equal forces towards the back at the ends of its horizontal diameter so as thereby to change the horizontal section to a slightly greater focal length and the vertical section to a slightly shorter focal length. Thus, when the arc lamp is moved slightly closer in so as to preserve the concentration, the resultant beam remains parallel vertically but horizontally is opened out into a flat fan-shaped beam of from 2° to 15° of divergence according to the amount of pressure and the amount of distortion that the mirror will stand.

Stop collars on the screws, $g$, $g$, are provided, as shown, to prevent distortion of the mirror beyond a safe amount of stress.

When wide angles of divergence in a horizontal plane are desired the mirror is preferably made of very thin glass; as an instance, a 20″ diameter mirror may be made of glass of under ⅛″ thickness.

It will be seen from Figures 1 and 2 that a mirror has been illustrated of a pattern suitable for use with an arc lamp of the horizontal type in which the carbons pass through a hole in the centre of the mirror. In cases where this hole is not required, the distorting members may be modified and actuated by one ball-ended screw centrally located, thus rendering a compensating plate unnecessary.

Thus, as shown in Figure 3, the mirror is without a central aperture, while the two beams, $d^3, f^3$, are similar to the beams, $d, f$, of Figures 1 and 2, and are actuated by the single centrally-disposed ball-ended screw, $g^2$, the compensating plate, $h$, being omitted. The screw, $g^2$, thus serves as a single instrumentality whereby the desired distorting forces may be simultaneously applied to the mirror at about the ends of two diameters mutually at right angles.

The invention is not only applicable to silvered glass mirrors but also to mirrors or other material having the necessary elastic properties.

Having now described my invention, what I claim as new and desire to secure by Letters Patent is:—

1. The combination of a searchlight projector mirror; means contacting with said mirror for applying opposite forces to points thereof concentrated at about the ends of two diameters of said mirror mutually at right angles differentially to alter the curvature of said mirror along said diameters by elastic deformation thereof and mechanical means for simultaneously actuating said force-applying means.

2. The combination claimed in claim 1, in which said force-applying means are resilient.

3. The combination claimed in claim 1, in which a single instrumentality actuates said force-applying means.

4. The combination of a searchlight projector mirror, means for applying distorting forces parallel to the axis of said mirror concentrated at about the ends of a diameter of said mirror, other means for applying distorting forces likewise parallel to the axis of said mirror concentrated at about the ends of a diameter of said mirror at right angles to said first-mentioned diameter and mechanical means for simultaneously actuating said distorting force applying means.

5. The combination of a searchlight projector mirror, means contacting with said mirror for applying distorting forces parallel to the axis of said mirror concentrated at about the ends of a diameter of said mirror, other means contacting with said mirror for applying distorting forces equal and opposite to said first-mentioned distorting forces concentrated at about the ends of a diameter of said mirror at right angles to said first-mentioned diameter and mechanical means for simultaneously actuating said distorting force applying means.

6. The combination of a searchlight projector mirror, a frame, means for attaching said mirror to said frame, self-contained means other than said frame and acting independently thereof for positively modifying the curvature of said mirror by elastic deformation thereof, and yieldable means connecting said mirror and said self-contained means.

7. The combination of a searchlight projector mirror, a frame, yieldable means for attaching said mirror to said frame, self-contained means other than said frame and acting independently thereof for positively modifying the curvature of said mirror by elastic deformation thereof, yieldable means connecting said mirror and said self-contained means.

In testimony whereof I have signed my name to this specification.

CHARLES ALGERNON PARSONS.